United States Patent [19]

Takabe et al.

[11] Patent Number: 4,794,221

[45] Date of Patent: Dec. 27, 1988

[54] APPARATUS AND METHOD FOR EXCHANGING ELECTRODE CHIPS USED FOR RESISTANCE WELDING

[75] Inventors: Fumio Takabe; Masashi Kitadate; Makoto Sumiyoshi; Kiyohiko Igarashi; Kazuo Suzuki; Takashi Akita, all of Toyota, Japan

[73] Assignee: Toyota Jidosha Kabushiki Kaisha, Aichi, Japan

[21] Appl. No.: 95,647

[22] Filed: Sep. 14, 1987

[30] Foreign Application Priority Data

Nov. 26, 1986 [JP] Japan .................... 61-181449[U]
Nov. 26, 1986 [JP] Japan .................... 61-181450[U]

[51] Int. Cl.⁴ .................................... B23K 11/30
[52] U.S. Cl. .................... 219/86.8; 219/86.1; 219/86.25; 901/42
[58] Field of Search .............. 219/86.1, 86.25, 86.7, 219/86.8; 901/42

[56] References Cited

FOREIGN PATENT DOCUMENTS 57-202986 12/1982 Japan .................... 219/86.7
61-41482 3/1986 Japan .
61-41483 3/1986 Japan .
1192924 11/1985 U.S.S.R. .................... 219/86.8

Primary Examiner—Clifford C. Shaw
Attorney, Agent, or Firm—Finnegan, Henderson, Farabow, Garrett and Dunner

[57] ABSTRACT

An apparatus for exchanging electrode chips used for resistance welding. The apparatus includes a base to which a shaft is rotatably mounted. A power source is connected to one end of the shaft to rotate the shaft. An electrode chip-withdrawing knife tool is made of a board connected to the other end of the shaft. The knife tool is provided with recesses which are radially directed about the axis of the shaft. The recesses have their respective knife edge portions each of which is fitted into an annular groove formed between the step portion at the front end of the shank of each arm of a welding gun and the electrode chip fitted over the shank. An electrode chip supply holder in which new polished electrode chips are received is held by a guide member.

11 Claims, 6 Drawing Sheets

APPARATUS AND METHOD FOR EXCHANGING ELECTRODE CHIPS USED FOR RESISTANCE WELDING

BACKGROUND OF THE INVENTION

1. Field of the Invention

The present invention relates to an apparatus and a method for exchanging electrode chips used for resistance welding and, more particularly, to an apparatus and a method for removing used electrode chips from the shanks of the arms of the welding gun of a resistance spot welder and then installing new polished electrode chips on the shanks.

2. Description of the Prior Art

Heretofore, the electrode chips mounted on the shanks of the arms of a conventional resistance spot welder have been exchanged for new ones manually by an operator. When a spot welding is performed on a surface-treated steel sheet, such as galvanized sheet iron, the lifetime of electrode chips are extremely short. Especially, the electrode chips on a robot spot welder are frequency changed, because one welding gun produces tens of welds. Therefore, much labor is needed to exchange electrode chips, thus lowering the productivity. Also, where electrode chips are exchanged for new ones manually, various ancillary equipments for improving the efficiency and the safety of the work, such as falsework, must be provided. This makes the whole welding equipment larger and more expensive. Another method of managing electrode chips consists in polishing the chips while the chips are held to an electrode chip holder. However, where special electrodes which are difficult to polish are used, the polishing operation is carried out unsuccessfully or the polishing accuracy is low. Therefore, defective welds tend to be produced. For this reason, the actual situation is that the management of electrode chips depends on exchange of the chips.

In an attempt to exchange electrode chips without requiring any operator's manual operation, some apparatuses have been proposed. For example, an apparatus disclosed in Japanese Utility Model Laid-Open No. 41,482/1986 has a tool for withdrawing electrode chips. The front end of this tool is shaped like a wedge. An apparatus disclosed in Japanese Utility Model Laid-Open No. 41,483/1986 has an electrode chip-withdrawing tool making use of leverage.

When the automatic electrode chip exchange apparatus disclosed in Japanese Utility Model No. 41,482/1986 or 41,483/1986 is used, it is possible to withdraw electrode chips by a mechanical force without requiring an operator's manual operation. However, since a wedge or leverage is employed, the electrode chip-withdrawing tool must be caused to move a large stroke to obtain a sufficient force to withdraw electrode chips. Therefore, the apparatus is large in size. Hence, the space and the cost required are increased.

SUMMARY OF THE INVENTION

It is an object of the present invention to provide an electrode chip exchange apparatus for resistance welding, the apparatus being free of the foregoing problems.

The above object is achieved by an apparatus comprising a base, a shaft rotatably mounted to the base, a chip-withdrawing knife tool mounted integrally with one end of the shaft, a swinging lever connected to the other end of the shaft for rotating the shaft about its axis, knife edge portions formed around recesses formed in the knife tool, an electrode chip supply holder in which new polished electrode chips are received, and a locating guide member that holds the holder in such a way that the holder can slide. The knife tool is made of a board. A welding gun includes arms having shanks. Step portions are formed at the front ends of the shanks. A groove is formed between each step portion and the electrode chip fitted over the shank. The knife edge portions can be engaged in their respective grooves.

When the electrode chips are to be exchanged for new ones, the shanks are moved together with the electrode chips into the positions of the recesses in the knife tool to insert the knife edge portions of the recesses into their respective grooves. Then, the swinging lever is operated to rotate the knife tool via the shaft. Thus, it is possible to withdraw the chips from the shanks certainly in a short time. Subsequently, the shanks from which the chips have been withdrawn are moved by a welding robot into the position of the electrode chip supply holder in which new polished electrode chips are received. The shanks are moved toward each other to fit the new chips over the shanks. Thereafter, the shanks are moved away from each other. As a result, the fitted chips are disengaged from the holder. Thus, the electrode chips are exchanged for new ones.

Other objects and features of the invention will appear in the course of the description thereof which follows.

DESCRIPTION OF THE PREFERRED EMBODIMENTS

Figure 1:
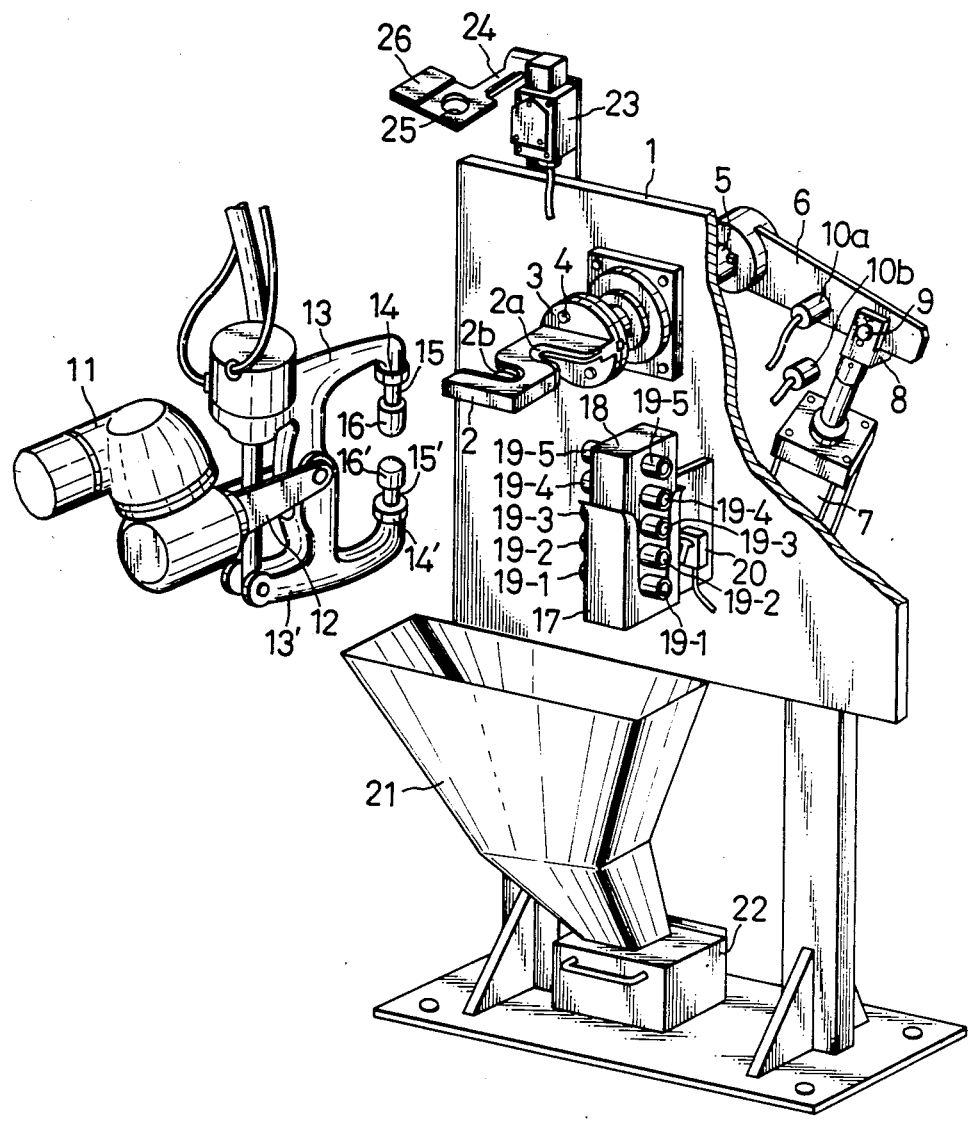
FIG. 1 is a perspective view of an electrode chip exchange apparatus according to the invention.
Figure 2:
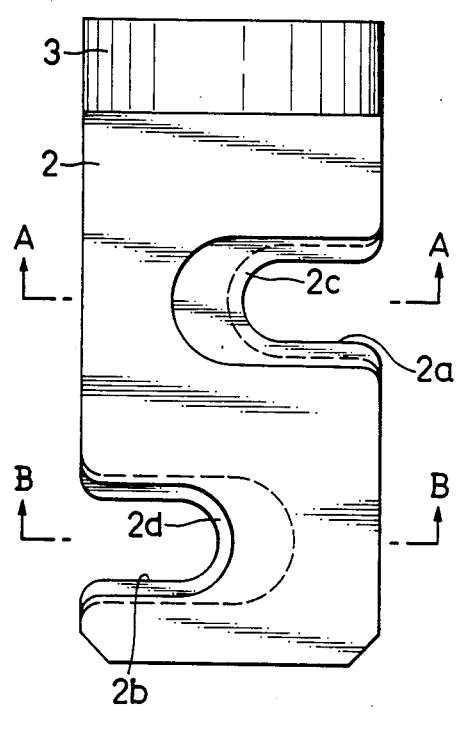
FIG. 2 is an enlarged plan view of the chip-withdrawing knife tool shown in FIG. 1.
Figure 3:
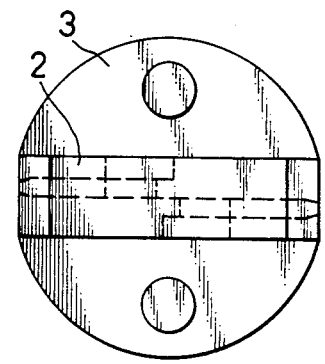
FIG. 3 is a front elevation of the knife tool shown in FIG. 2.
Figure 4:
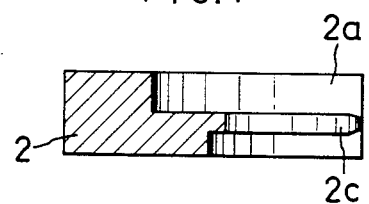
FIG. 4 is a cross-sectional view taken on line A—A of FIG. 2.
Figure 5:
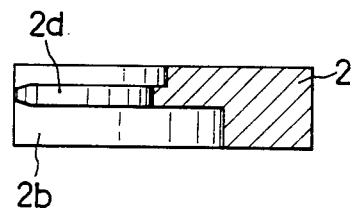
FIG. 5 is a cross-sectional view taken on line B—B of FIG. 2.

Referring to FIG. 1, there is shown an electrode chip exchange apparatus embodying the concept of the present invention. This apparatus includes a base 1 and a knife tool 2 for withdrawing electrode chips 16 and 16' (described later). The tool 2 is made of a flat board and shaped like the letter "S", as shown in FIG. 2. The tool 2 is provided with two recesses 2a and 2b which are formed on opposite sides. Knife edge portions 2c and 2d are formed along the recesses 2a and 2b, respectively. The tool 2 has a flange 3 mounted to one end of a shaft 5 that is rotatably mounted to the base 1 by bolts 4. The recesses 2a and 2b are directed radially outward about the axis of the shaft 5. These recesses 2a and 2b can also take a polygonal, V-shaped, or semicircular form. A swinging lever 6 is connected to the other end of the shaft 5. A cylinder 7 has a knuckle 8 that is rotatably connected to the other end of the lever 6 by a pin 9.

Sensors 10a and 10b act to detect the position of the lever 6, and each consists of a proximity switch, for example. In particular, the sensor 10a detects the position of the lever 6 before it is operated. The sensor 10b detects the position of the lever 6 after the tool 2 has been rotated with the shaft about the axis of the shaft 5 to pull out the electrode chip 16 or 16'. An air cylinder 7 connected to the lever 6 is operated to rotate the shaft 5.

A robot welder, the body of which is not shown, has an arm 11. A fixing member 12 is used to mount a welding gun having arms 13 and 13' to the arm 11. Screw adapters 14 and 14' are screwed to the arms 13 and 13', respectively. Shanks 15 and 15' over which the electrode chips 16 and 16' are respectively fitted are fitted in the adapters 14 and 14', respectively.

Figure 9:
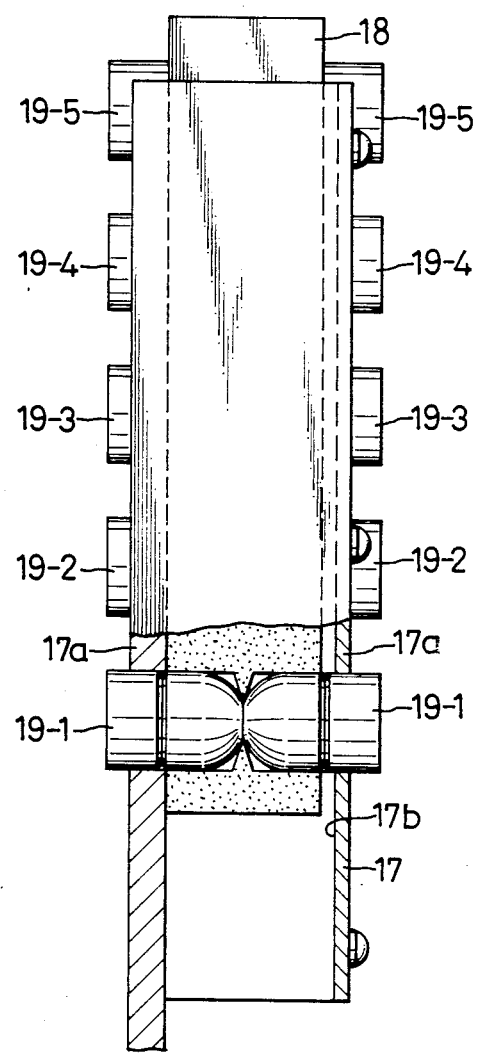
FIG. 9 is a partially cutaway enlarged front elevation of the locating guide member and the electrode chip supply holder shown in FIG. 1.
Figure 10:
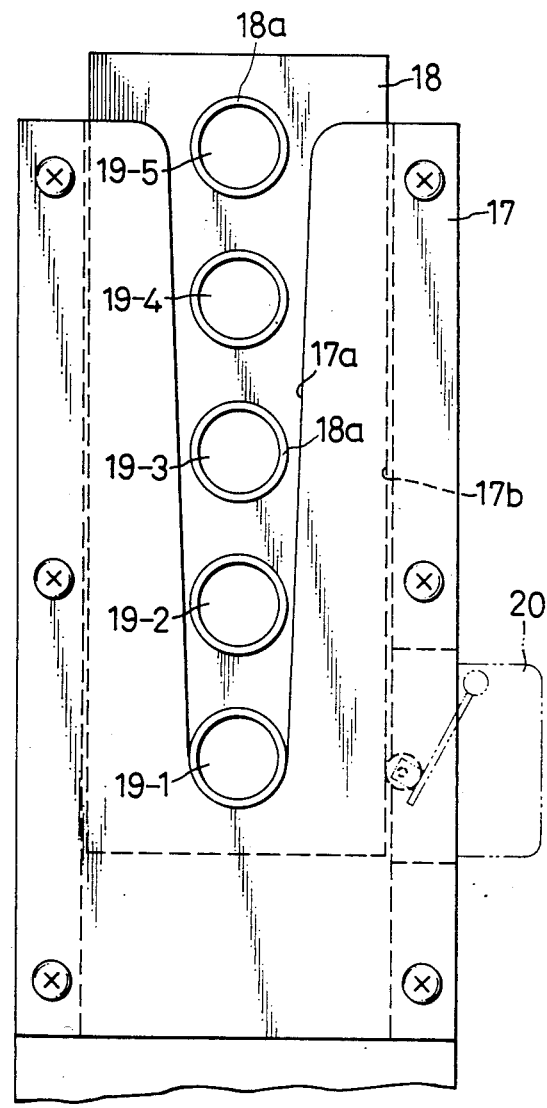
FIG. 10 is a side elevation of the locating guide member and the holder shown in FIG. 9.

A locating guide member 17 is mounted to the base 1. The guide member 17 has tapering grooves 17a, as shown in FIGS. 9 and 10, which are formed in the front and rear surfaces, respectively, of the member 17. This guide member 17 has a hole 17b through which an electrode chip supply holder 18 (described later) is passed. The grooves 17a which extend to the upper end of the guide member 17 are in communication with the hole 17b. The lower end of each groove 17a is closed. The holder 18 is placed in the guide member 17 and shaped like a box. Holes 18a are formed at opposite positions in the front and rear surfaces of the holder 18. New polished electrode chips 19-1, 19-2, 19-3, 19-4, 19-5 are inserted in the holes 18a in such a way that their rear ends protrude outwardly and that the heads of the chips are engaged.

A detector switch 20, such as a limit switch, is mounted near the guide member 17 and senses whether the chip supply holder 18 is located on the guide member 17. Those electrode chips which have come out of the holder 18 fall into a receiving vessel 21. Immediately after all polished electrode chips are supplied from the chip supply holder 18, the holder 18 drops into a holder-receiving box 22, since the chips which held the holder 18 come out of it. A limit switch 23 is actuated by a lever 24. The front portion of the lever 24 is provided with a hole 25 whose diameter is larger than the outside diameter of electrode chips by several millimeters. A flat plate portion 26 is formed ahead of the lever 24. In the electrode chip exchange apparatus constructed as described thus far, electrode chips are withdrawn from the shanks of the welding gun, and new polished electrode chips are mounted on the shanks.

Figure 6:
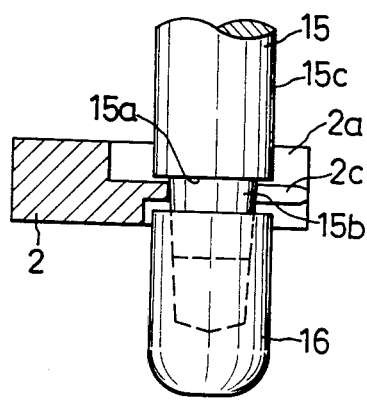
FIG. 6 is a front elevation partially in cross section of the chip-withdrawing knife tool shown in FIG. 1, for illustrating a first action.

The electrode chips are withdrawn in the manner described below. The welding robot (not shown) receives a signal indicating a full count, for example, and senses that the chips have been expended. Subsequently, the robot selects a program for changing electrode chips, and ascertains whether the mounted electrode chips are placed in position in accordance with the program. For this purpose, it puts the electrode chips 16 and 16' alternately into the hole 25 formed in the lever 24 that actuates the limit switch 23. At this time, if either the chip 16 or 16' is not placed in position due to deformation of the arms 13 and 13' of the welding gun or for other cause, the chip 16 or 16' comes into contact with the inner fringe of the hole 25, rotating the lever 24. As a result, the limit switch 23 is actuated. Thus, the abnormal condition that the chip 16 or 16' is not placed in position can be detected. Then, the resulting signal is sent to the outside, and the robot discontinues its subsequent operations. The installation is required to be repaired. If no abnormality is found, then the robot moves the shank 15 and the electrode chip 16 into the recess 2a in the chip-withdrawing knife tool 2, as shown in FIG. 6, to pull out the chip 16. Thereafter, compressed air is supplied into the cylinder 7 so that the rod of the cylinder 7 may be retracted. This rotates the shaft 5 via the swinging lever 6, thus rotating the knife tool 2 connected to the shaft 5. As shown in FIG. 6, the shank 15 has a tapering portion 15b into which the electrode chip 16 is fitted. The shank further includes an enlarged portion 15c. A step portion 15a is formed between the tapering portion 15b and the enlarged portion 15c. The knife edge portion 2c formed around the recess 2a in the knife tool 2 engages the step portion 15a, and rotates around the step portion 15a.

Figure 7:
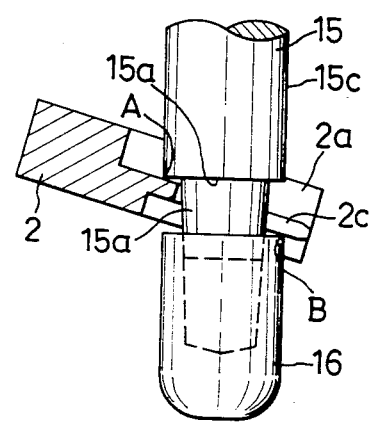
FIG. 7 is a view similar to FIG. 6, but for illustrating a second action.
Figure 8:
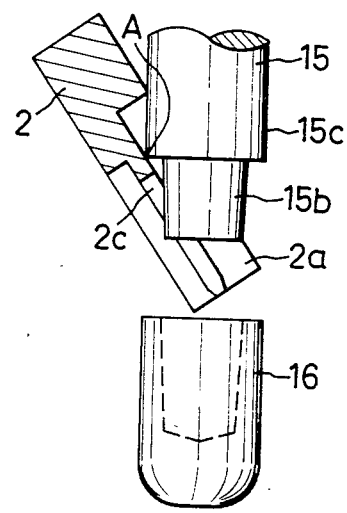
FIG. 8 is a view similar to FIG. 6, but for illustrating a third action.

FIG. 7 shows the condition in which the rotation has just started to rotate. Under this condtion, the knife edge portion 2c is in contact with the enlarged portion 15c at a point A. The knife edge portion 2c is in contact with the fringe of a hole formed in the chip 16 at a point B. As the knife edge portion 2 rotates, a larger separating force is exerted between the points A and B, until the chip 16 is moved away from the tapering portion 15b as shown in FIG. 8.

The knife tool 2 can perform its function if either the recess 2a having the knife edge portion 2c or the recess 2b having the knife edge portion 2d is available. Where either the recess 2a or 2b is omitted, the welding robot may be operated to rotate the welding gun through 180°.

After the electrodes 16 and 16' have been fully pulled out in this way, the shanks 15 and 15' of the welding robot (not shown) are alternately pressed against the flat plate portion 26 of the lever 24 with a slight force. At this time, if the chips 16 and 16' are pulled out, then the limit switch 23 is not actuated. If at least one of them is not pulled out, the switch 23 is actuated. Thus, the operation of the robot is controlled. In this way, the abnormal condition that either the chip 16 or 16' is not pulled out can be detected.

After the electrode chips 16 and 16' have been withdrawn from the shanks 15 and 15' of the welding gun, new polished electrode chips are mounted in the manner described below. The electrode chip supply holder 18 is urged into the locating guide member 17 having the grooves which are open at their upper sides. The width of the holder 18 is smaller than the inside dimension of the guide member 17 by several millimeters. The holder 18 is formed with five holes arranged in a line on each side. Pairs of opposed electrodes chips can be forced into these holes. New electrode chips 19-1, 19-2, 19-3, 19-4, 19-5 are successively pressed into these holes in such a way that their rear ends protrude, and the chips are set in the guide member 17. As can be seen from FIG. 1, the rear end portions of the lowermost pressed chips 19-1 protrude from the holder 18 and are in contact with the lower ends of the grooves 17a (see FIGS. 9 and 10) formed in the guide member 17, holding the holder 18. Therefore, the holder 18 is prevented from dropping down the guide member 17. The welding robot (not shown) brings the shanks 15 and 15' of the welding gun from which the chips 16 and 16' have been removed into this location. Then, a valve (not shown) is actuated to move the arms 13 and 13' of the welding gun so that the portions of the arms to which electrodes are mounted may approach each other. As a result, the new polished electrode chips 19-1 are fitted over the tapering portions of the shanks 15 and 15'.

When the valve (not shown) is so actuated that the portions of the arms 13 and 13' carrying the electrodes move away from each other, the electrode chips 19-1 come out of the chip supply holder 18 which is then no longer held by the chips 19-1. Therefore, the holder 18 begins to drop, but it is brought to a stop by the next higher electrode chips 19-2. This mechanism permits the welding robot to take the new polished electrode chips located at the same positions. Thus, it is possible to supply electrode chips without the need to control the operation of the welding robot in a complex manner.

The new polished electrode chips 19-1, 19-2, 19-3, 19-4, 19-5 which are placed in the holder 18 are taken out. Then, the holder 18 is allowed to drop from the locating guide member 17. This is detected by the limit switch 20, which then issues a warning. Next, a new electrode chip supply holder is manually supplied within several hours before new polished electrode chips are needed. The limit switch 20 may be disposed at a different position so that a warning is given when the number of the remaining new electrode chips reaches a preset number, such as one, two, or three. The number of the holes formed in the electrode supply holder 18 to install electrode chips may be increased to lengthen the period for which the single electrode chip supply holder is used.

It is also possible to carry the apparatus shown in FIG. 1 together with welded works by a carriage to perform a series of flow-line welding steps. In this case, the apparatus is connected with the installed robot welder by an electrically conducting device, and control signals are transmitted between them. This dispenses with the need to install this kind of apparatus on every robot welder.

Figure 11:
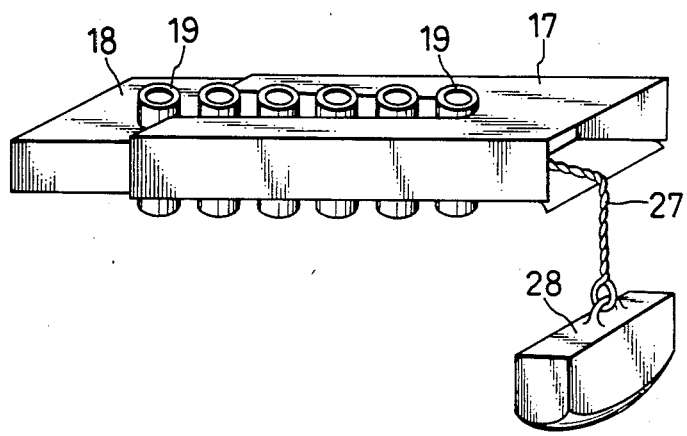
FIG. 11 is a perspective view of another locating guide member and another electrode chip supply holder according to the invention.

Depending on the shape of the welding gun of the welding robot, the locating guide member 17 shown in FIGS. 1, 9, 10 may not be placed upright. In this case, the guide member 17 is once raised so that it may assume a vertical or inclined posture by a cylinder or the like before the electrode chips are exchanged for the next chips. As a modified example, a cover is provided on the entrance side of electrode chips and pushed by a spring. A further example is shown in FIG. 11, where the electrode chip supply holder 18 receiving a number of new polished electrode chips 19 and the locating guide member 17 are placed horizontally. The holder 18 is pulled by a weight 28 and a rope 27 toward the exit side of electrode chips.

Figure 12:
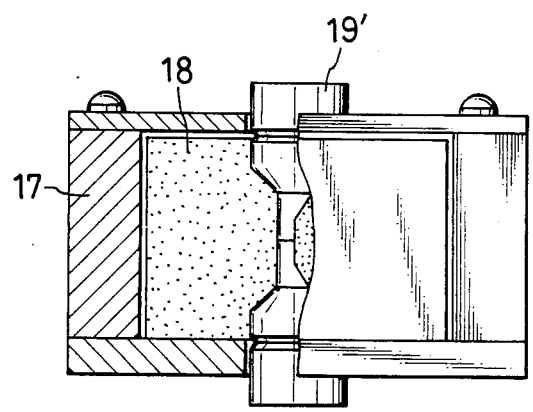
FIG. 12 is a partially cutaway plan view of a further locating guide member and a further electrode chip supply holder according to the invention.

Referring next to FIG. 12, specially shaped electrode chips 19' are inserted in holes which are formed in the electrode chip supply holder 18 so as to conform to the shape of the chips 19'. The chips 19' are arrayed in a certain direction.

What is claimed is:

1. An apparatus for exchanging electrode chips used for resistance welding, said apparatus comprising:
   a shaft rotatably mounted to a base;
   driving means connected to one end of the shaft for rotating the shaft about its axis;
   a chip-withdrawing tool mounted axially at the other end of the shaft and having a surface portion disposed in a plane parallel to the radius of the shaft with at least one open recess formed in said surface portion of the tool, said chip withdrawing tool having a knife edge portion in said at least one recess;
   a locating guide member mounted on the base; and
   an electrode chip supply holder slidably mounted on the locating guide member for positioning the electrode chips relative the chip withdrawing tool.

2. An apparatus for exchanging electrode chips used for resistance welding as set forth in claim 1, wherein the knife edge portion of the tool forms the boundary of said at least one recess.

3. An apparatus for exchanging electrode chips used for resistance welding as set forth in claim 1, wherein the chip withdrawing tool is in the form of a flat board having a plurality of spaced recesses.

4. An apparatus for exchanging electrode chips used for resistance welding as set forth in claim 1, wherein the number of the recesses formed in the tool is two, and wherein the two recesses open in diametrically opposite directions.

5. An apparatus for exchanging electrode chips used for resistance welding as set forth in claim 1, wherein the electrode chip supply holder is in the form of a flat board and has a plurality of holes in front and rear surfaces thereof, the holes formed in the front surface being opposite to the holes formed in the rear surface, each hole receiving a portion of a selected one of the electrode chips.

6. An apparatus for exchanging electrode chips as set forth in claim 1 or 5, wherein a portion of each electrode chip received in the electrode chip supply holder protrudes from the received hole, is engaged in a groove formed in the locating guide member, and engages one closed fringe of the groove.

7. An apparatus for exchanging electrode chips as set forth in claim 6, wherein, upon removal of electrode chips in the electrode chip holder from their respective grooves, the holder is operative to slide relative to the locating guide member into the positions of the removed electrode chips.

8. An apparatus for exchanging electrode chips as set forth in claim 6, further comprising spring means for urging the sliding of the holder relative to the locating guide member into the position of the removed electrode chip.

9. An apparatus for exchanging electrode chips as set forth in claim 1, further including a detector switch for sensing the position of the locating guide member relative the electrode chip supply holder.

10. An apparatus for exchanging electrode chips used for resistance welding as set forth in claim 1, further comprising a welding gun supporting an electrode chip, said gun having a shank of less diameter than the gun and chip to form a step portion of a predetermined width between the gun and chip, the knife edge portion of the tool having a thickness less than the width of the step portion.

11. A method of changing electrode chips removably mounted on spaced opposing welding welding gun shafts and wherein an annular groove is formed between the mounted electrode chip and the corresponding shaft forming a step poriton, said method comprising the steps of:

positioning a chip-withdrawing tool having at least one recess therein relative to a mounted electrode chip with the tool fittingly engaging the chip in the recess of the tool at the annular groove;

rotating the tool through a selected angle to engage the step portion and the electrode chip for removing the chip from the shaft;

aligning axially the opposing shafts with at least one unmounted electrode chip supported in a predetermined position; and moving at least one of the opposing shafts axially toward the other one of the opposing shafts for mounting the electrode chips on the shafts.

* * * * *